United States Patent Office 2,867,652
Patented Jan. 6, 1959

2,867,652

NEW CAROTENOID AND PROCESS FOR THE MANUFACTURE THEREOF

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application January 30, 1957
Serial No. 637,094

Claims priority, application Switzerland January 31, 1956

11 Claims. (Cl. 260—488)

The present invention relates to a novel carotenoid compound, 1,26-di(2,6,6-trimethyl-1-cyclohexen-1-yl)-3,7,11,16,20,24 - hexamethyl - 1,3,5,7,9,11,15,17,19,21,23,25-hexacosadodecaen-13-yne, which is useful as a coloring agent, particularly for coloring foods and feeds, and as an intermediate in the synthesis of similar coloring agents, to a process for the manufacture of said carotenoid compound, to intermediates useful in the synthesis of said carotenoid compound, and to processes for the manufacture of said intermediates.

According to the present invention 1,26-di(2,6,6-trimethyl-1-cyclohexen-1-yl)-3,7,11,16,20,24 - hexamethyl-1,3,5,7,9,11,15,17,19,21,23,25-hexacosadodecaen-13-yne is prepared by condensing a 3,8-dimethyl-2,9-di(lower alkoxy)-1,3,7,9-decatetraen-5-yne at both chain ends with an 8 - (2,6,6 - trimethyl-1-cyclohexen-1-yl)-2,6-dimethyl-1,1-di(lower alkoxy)-2,4,6-octatriene, treating the resulting 1,26-di(2,6,6-trimethyl-1-cyclohexen-1-yl)-3,7,11,16,20,24-hexamethyl-8,10,10,17,17,19-hexa(lower alkoxy)-2,4,6,11,15,20,22,24-hexacosaoctaen-13-yne with an acid agent, reducing the resulting 1,26-di(2,6,6-trimethyl-1-cyclohexen - 1 - yl) - 3,7,11,16,20,24 - hexamethyl-2,4,6,8,11,15,18,20,22,24-hexacosadecaen-13-yne-10,17-dione to 1,26 - di(2,6,6 - trimethyl - 1 - cyclohexen - 1 - yl) - 3,7,11,16,20,24 - hexamethyl - 2,4,6,8,11,15,18,20,22,24-hexacosadecaen-13-yne-10,17-diol and subjecting the latter to a treatment causing formation of two additional double bonds and allyl rearrangement with formation of 1,26-di-(2,6,6-trimethyl-1-cyclohexen-1-yl)-3,7,11,16,20,24-hexamethyl - 1,3,5,7,9,11,15,17,19,21,23,25-hexacosadodecaen-13-yne.

The process may be illustrated by the following flow diagram wherein R' represents a lower alkyl radical:

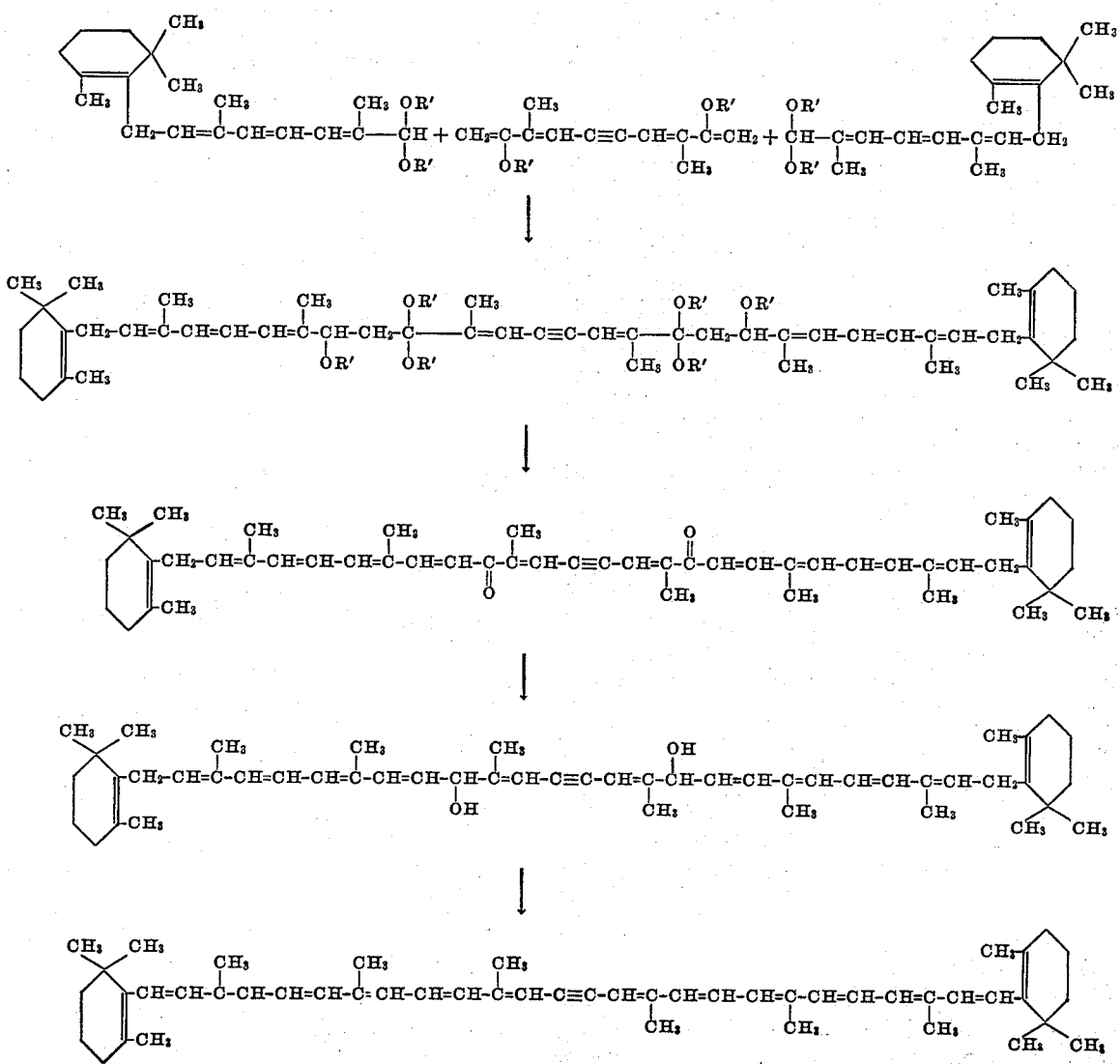

A further object of this invention is to provide novel 1,26 - di(2,6,6 - trimethyl - 1 - cyclohexen - 1 - yl) - 3,7,11,16,20,24 - hexamethyl - 8,10,10,17,17,19 - hexa(lower alkoxy)-2,4,6,11,15,20,22,24-hexacosaoctaen-13-yne compounds which are useful as intermediates in the synthesis of the novel carotenoid compound of this invention.

According to the present invention these intermediates are prepared by condensing a 3,8-dimethyl-2,9-di(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene.

Another object of this invention is to provide a further novel compound, 1,26-di(2,6,6-trimethyl-1-cyclohexen-1-yl)-3,7,11,16,20,24-hexamethyl-2,4,6,8,11,15,18,20,22,24-hexacosadecaen-13-yne-10,17-dione, which is also useful as an intermediate in the synthesis of the carotenoid compound of the invention.

According to the present invention the above intermediate is prepared by condensing a 3,8-dimethyl-2,9-di-(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene and treating the resulting 1,26-di(2,6,6-trimethyl-1-cyclohexen-1-yl) - 3,7,11,16,20,24 - hexamethyl - 8,10,10,17,17,19-hexa(lower alkoxy)-2,4,6,11,15,20,22,24-hexacosaoctaen-13-yne with an acid agent.

Still a further object of the present invention is to provide novel 1,26-di(2,6,6-trimethyl-1-cyclohexen-1-yl)-3,7,11,16,20,24-hexamethyl-2,4,6,8,11,15,18,20,22,24-hexacosadecaen-10,17-di-R-13-ynes wherein R represents a member selected from the group consisting of hydroxy and acyloxy, which compounds are also useful as intermediates in the synthesis of the carotenoid compound of this invention.

According to the present invention these intermediates are prepared by condensing a 3,8-dimethyl-2,9-di(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene, treating the resulting 1,26 - di(2,6,6 - trimethyl - 1 - cyclohexen - 1 - yl) - 3,7,11,16,20,24 - hexamethyl - 8,10,10,17,17,19 - hexa(lower alkoxy - 2,4,6,11,15,20,22,24-hexacosaoctaen-13-yne with an acid agent, and reducing the resulting 1,26-di(2,6,6-trimethyl - 1 - cyclohexen-1-yl)-3,7,11,16,20,24-hexamethyl-2,4,6,8,11,15,18,20,22,24 - hexacosadecaen - 13-yne-10,17-dione to 1,26-di-(2,6,6-trimethyl-1-cyclohexen-1-yl)-3,7,11,16,20,24 - hexamethyl - 2,4,6,8,11,15,18,20,22,24-hexacosadecaen-13-yne-10,17-diol, and, if desired, esterifying the latter.

The starting compounds required in the synthesis of the novel carotenoid compound of this invention can be prepared, e. g., as follows:

*3,8-dimethyl-2,9-di(lower alkoxy)-1,3,7,9-decatetraen-5-yne (hereinafter called $C_{12}$-yne-dienol ether).*—A solution of 1 mole of 2,7-dimethyl-2,6-octadien-4-yne-1,8-dial in ten times its quantity of absolute ether is condensed with 2.1 moles of methyl-magnesium bromide, and the resulting 3,8-dimethyl-2,9-dihydroxy-3,7-decadien-5-yne is shaken for 15 hours with 15 times its quantity of manganese dioxide in methylene chloride. The resulting 3,8-dimethyl-2,9-dioxo-3,7-decadien-5-yne is suspended in slightly more than the double molecular proportion of an orthoformic acid ester, a 1% ethanolic solution of 0.001 to 0.002 mole of p-toluenesulfonic acid is added to the suspension, and the mixture is agitated for 48 hours at room temperature. The acetal formed is then boiled for 5–7 hours in toluene with 2.2 moles of acetic anhydride in the presence of 2 moles of pyridine, the acetic ester formed during the reaction being continuously removed from the reaction solution by distillation. The obtained product has ultra-violet absorption maxima at 320 and 340 m$\mu$ in petroleum ether solution.

*8 - (2,6,6 - trimethyl - 1 - cyclohexen - 1 - yl) - 2,6-dimethyl-1,1-di(lower alkoxy)-2,4,6-octatriene (hereinafter called $\beta$-$C_{19}$-aldehyde acetal).*—8-(2,6,6-trimethyl-1-cyclohexen-1-yl)-2,6-dimethyl-2,4-octatrien-1-al is acetalized with 1.2 moles of ethyl orthoformate and 1 mole of ethanol in the presence of a small amount of phosphoric acid at room temperature. In the same manner other acetals (e. g. the dimethyl acetal, the dibutyl acetal, etc.) can be prepared by means of the corresponding orthoformic acid esters (e. g. methyl orthoformate, butyl orthoformate, etc.) and alcohols (e. g. methanol, butanol etc.).

In the first step of the process according to the present invention the $C_{12}$-yne-dienol ether is condensed at both chain ends with $\beta$-$C_{19}$-aldehyde acetal in the presence of an acidic condensing agent. Suitable condensing agents include, e. g., boron trifluoride etherate, zinc chloride, titanium tetrachloride, ferric chloride, stannic chloride and the like. It is advisable to use the dienol ether of the same alcohol with which the $\beta$-$C_{19}$-aldehyde has been acetalized, e. g. 3,8-dimethyl-2,9-dimethoxy-1,3,7,9-decatetraen-5-yne together with the dimethyl acetal or 3,8-dimethyl-2,9-diethoxy-1,3,7,9-decatetraen-5-yne together with the diethylacetal. The condensation is preferably carried out at as low a temperature as possible in order to avoid undesired side reactions, such as polymerization. Depending on the condensing agent selected and on the acetal and dienol ether used for the condensation, the optimum reaction temperature varies between 5° and 50° C. According to a preferred mode of execution 1 mole of $C_{12}$-yne-dienol ether is reacted with 2 moles of acetal at a temperature of 20° to 40° C. in an inert solvent, such as benzene or petroleum ether, and in the presence of zinc chloride or boron trifluoride etherate. There is thus obtained a 1,26-di(2,6,6-trimethyl-1-cyclohexen-1-yl) - 3,7,11,16,20,24 - hexamethyl - 8,10,10,17,17,19 - hexa(lower alkoxy)-2,4,6,11,15,20,22,24)-hexacosaoctaen-13-yne (hereinafter called $\beta$-$C_{50}$-diether diketal). The reaction solution can be directly subjected to hydrolysis without isolating and purifying the condensation product. It is convenient to carry out the hydrolysis in the same reaction vessel as used for the condensation.

In the second step of the process according to the present invention the treatment with acidic agents may be preferably carried out in such a manner—e. g. by heating—that the reaction results in the direct formation of a diketone with splitting off of alcohol from the condensation product. There is thus obtained 1,26-di(2,6,6-trimethyl - 1 - cyclohexen - 1 - yl) - 3,7,11,16,20,24 - hexamethyl - 2,4,6,8,11,15,18,20,22,24 - hexacosadecaen - 13-yne-10,17-dione. The hydrolysis is conveniently carried out by means of water-soluble organic or inorganic acids, e. g. p-toluenesulfonic acid, acetic acid, propionic acid, oxalic acid, sulfuric acid, phosphoric acid and the like, or by means of water-soluble acid salts, e. g. zinc chloride or sodium bisulfate. It is advantageous to carry out the hydrolysis in the absence of oxygen and to add an antioxidant, such as hydroquinone, to the reaction mixture. It is convenient to operate under conditions which permit the alcohol formed to be continuously eliminated from the reaction mixture. A water-miscible solvent, such as dioxane, tetrahydrofurane, ethyleneglycol dimethyl ether and the like, may be added to the reaction mixture in order to obtain a homogeneous mixture. Preferably, the condensation product is heated to about 100° C. with dilute phosphoric acid in the presence of a water-miscible solvent or with acetic acid in the presence of an alkali metal acetate and of some water. On dilution of the reaction mixture with water the diketone precipitates. It can be purified by partition between solvents, chromatography and crystallization. It has characteristic absorption maxima in the ultra-violet spectrum.

In the third step of the process according to the present invention the diketone is reduced to the diol. This can be brought about by known methods, e. g. by treating the diketone with sodium- or lithium-boron hydride or with sodium- or lithium-aluminium hydride in a solvent, or by heating the diketone with a metal alkoxide, such as aluminium ethoxide or isopropoxide, in an alcohol type solvent. The reaction is advantageously carried out in the absence of oxygen and in an inert atmosphere, e. g. in a nitrogen atmosphere. A suitable mode of operation consists in heating the diketone in an inert solvent, such as benzene or toluene, with aluminium isopropoxide in the presence of isopropanol, the acetone formed during the reaction being continuously distilled off from the reaction mixture. The diol thus obtained is a highly viscous oil which has characteristic absorption maxima in the ultra-violet spectrum. It consists of a mixture of isomers which is best directly reacted without preliminary purification.

In the fourth step of the process according to the present invention the diol, if desired after having been esterified, is subjected to a treatment causing splitting off of two molecules of water or acid, respectively, and allyl rearrangement. The allyl rearrangement and the elimination of water take place simultaneously when the diol is subjected to the action of aqueous or anhydrous hydrohalic acid. It is advantageous to first esterify, e. g. acetylate, the diol by known methods. According to a convenient mode of carrying out the elimination of water or acid a solution of the diol or of an ester thereof in an inert solvent, such as diethyl ether, methylene chloride, dioxane and the like, is treated with anhydrous hydrohalic acid. It is advantageous to use diethyl ether or ethyl acetate as the solvent and to employ an excess of alcoholic hydrochloric acid. Only a small proportion of acid need be used if the reaction is accelerated by heating. Another convenient mode of execution consists in treating the diol or an ester thereof in a halogenated hydrocarbon having a high dipole moment with aqueous hydrohalic acid at a temperature below 0° C. and then splitting off hydrogen halide from the formed halogenated compound by means of water or of a basic compound. Suitable solvents which may be used for this reaction include methylene chloride and chloroform, and concentrated aqueous hydrobromic acid may be used as the aqueous hydrohalic acid. There is thus obtained 1,26-di(2,6,6-trimethyl-1-cyclohexen-1-yl)-3,7,11,16,20,24 - hexamethyl - 1,3,5,7,9,11,15,17,19,21, 23,25-hexacosadodecaen-13-yne which yields red-colored solutions in vegetable and animal oils. This compound is intended to be used as coloring agent, particularly for coloring foods and feeds, and as intermediate in the preparation of similar coloring agents.

The invention will be further illustrated by the following examples which, however, are not intended to be limitative thereof.

EXAMPLE 1

(a) Condensation 1.5 ml. of a 10% solution of zinc chloride in ethyl acetate were added to 25 g. of 8-(2,6,6-trimethyl-1-cyclohexen - 1 - yl) - 2,6 - dimethyl - 1,1 - diethoxy - 2,4,6-octatriene (yellow oil; $n_D^{23}$=1.5325; U. V. absorption maxima at 278 and 288 m$\mu$ in petroleum ether) in 10 ml. of dry benzene. To this mixture was gradually added at about 35° C., while stirring, a solution of 8.5 g. of 3,8 - dimethyl - 2,9 - diethoxy - 1,3,7,9 - decatetraen - 5-yne (M. P. 65° C.; U. V. absorption maxima at 320 and 340 m$\mu$ in petroleum ether) in 14 ml. of dry benzene, and the reaction mixture was subsequently stirred for a further 18 hours at room temperature. The 1,26-di(2,6,6-trimethyl - 1 - cyclohexen - 1 - yl) - 3,7,11,16,20,24 - hexamethyl - 8,10,10,17,17,19 - hexaethoxy - 2,4,6,11,15,20, 22,24-hexacosoactaen-13-yne which formed precipitated in crystalline form. It consisted of a mixture of isomers. This mixture was hydrolyzed directly without isolation. For purification purposes, a sample of this product was extracted with ether, the ether extract was washed with dilute sodium bicarbonate solution, the solvent was evaporated and the residue was triturated with petroleum ether. There was thus obtained a colorless crystalline powder having two maxima in the U. V. absorption spectrum at 280 and 292 m$\mu$ in petroleum ether solution.

(b) Treatment with acid

To the crude condensation mixture obtained as described sub (a) there was added a solution of 10 g. of sodium acetate in 5 ml. of water and 100 ml. of glacial acetic acid, and the mixture was stirred for 5 hours at 95–100° C. in a nitrogen atmosphere. The reaction mixture was then cooled, diluted with 10 ml. of water and extracted with 800 ml. of methylene chloride. The methylene chloride solution was washed with water and with dilute sodium bicarbonate solution, dried over sodium sulfate and evaporated. The resulting 1,26-di(2,6,6-trimethyl - 1 - cyclohexen - 1 - yl) - 3,7,11,16,20,24 - hexamethyl - 2,4,6,8,11,15,18,20,22,24 - hexacosadecaen - 13-yne-10,17-dione was purified by crystallization from benzene-alcohol or benzene-petroleum ether, and was obtained in the form of yellow crystals of M. P. 167–168° C.; U. V. absorption maxima at 323 and 403 m$\mu$ in petroleum ether.

(c) Reduction 60 ml. of dry benzene, 8 g. of aluminium propoxide and 70 ml. of isopropanol were added to 8 g. of 1,26-di(2,6,6 - trimethyl - 1 - cyclohexen - 1 - yl) - 3,7,11,16, 20,24 - hexamethyl - 2,4,6,8,11,15,18,20,22,24 - hexacosadecaen-13-yne-10,17-dione, and the mixture was heated for 4 hours at 90–110° C., the acetone that formed during the reaction being continuously distilled off from the reaction mixture. After cooling, 200 ml. of benzene and 200 ml. of ice-cold dilute hydrochloric acid were added. The benzene layer was separated, washed successively with water and with dilute sodium bicarbonate solution, dried over sodium sulfate, and the solvent was evaporated. There was thus obtained 1,26-di(2,6,6-trimethyl - 1 - cyclohexen - 1 - yl) - 3,7,11,16,20,24 - hexamethyl - 2,4,6,8,11,15,18,20,22,24 - hexacosadecaen - 13-yne-10,17-diol in the form of a reddish highly viscous oil which was further reacted without any preliminary purification.

(d) Intramolecular dehydration and allyl rearrangement

The product obtained as described sub (c) was dissolved in 80 ml. of ether, and 20 ml. of alcohol and then 8 ml. of 23% alcoholic hydrochloric acid were added to the solution. After a few minutes the 1,26-di(2,6,6-trimethyl - 1 - cyclohexen - 1 - yl) - 3,7,11,16,20,24 - hexamethyl - 1,3,5,7,9,11,15,17,19,21,23,25 - hexacosadodecaen-13-yne began to crystallize out. The reaction mixture was allowed to stand at room temperature for 4 hours and then for an additional 15 hours at 0–5° C. in a carbon dioxide atmosphere. The crystals were filtered off and recrystallized from benzene-petroleum ether. There was thus obtained 1,26-di(2,6,6-trimethyl-1-cyclohexen - 1 - yl) - 3,7,11,16,20,24 - hexamethyl - 1,3,5,7,9, 11,15,17,19,21,23,25-hexacosadodecaen-13-yne in the form of dark-violet crystals of M. P. 189–190° C.; U. V. absorption maxima at 481 and 513 m$\mu$ in petroleum ether.

EXAMPLE 2

23.2 g. of 8-(2,6,6-trimethyl-1-cyclohexen-1-yl)-2,6-dimethyl-1,1-dimethoxy - 2,4,6 - octatriene (yellowish oil; $n_D^{21}$=1.545; U. V. absorption maxima at 278 and 289 m$\mu$ in petroleum ether) were condensed in the manner described in Example 1 with 3,8-dimethyl-2,9-diethoxy-1,3,-7,9-decatetraen-5-yne, and the resulting 1,26-di(2,6,6-trimethyl-1-cyclohexen-1-yl)-3,7,11,16,20,24 - hexamethyl-8,10,17,19-tetramethoxy-10,17-diethoxy - 2,4,6,11,15,20,-22,24-hexacosaoctaen-13-yne was treated directly with acetic acid and sodium acetate without any preliminary isolation. There was thus again obtained 1,26-di(2,6,6-trimethyl-1-cyclohexen-1-yl)-3,7,11,16,20,24 - hexamethyl-2,4,6,8,11,15,18,20,22,24-hexacosadecaen - 13 - yne-10,17-dione of M. P. 167–168° C.

8 g. of 1,26-di(2,6,6-trimethyl-1-cyclohexen-1-yl)-3,7,11,16,20,24 - hexamethyl - 2,4,6,8,11,15,18,20,22,24-hexacosadecaen-13-yne-10,17-dione were reduced in the manner described in Example 1, and the resulting crude reduction product was acetylated by allowing it to stand for 20 hours together with 50 ml. of pyridine and 20 ml. of acetic anhydride. After the addition of 100 ml. of ice-water, the mixture was extracted with ether, the ethereal solution was washed with cold dilute sulfuric acid and then with water, dried over sodium sulfate and concentrated. The residue was dissolved in 80 ml. of methylene chloride, and the solution was cooled to −40° C. by the addition of solid carbon dioxide. Then 3.4 ml. of glacial acetic acid were added, and 3.3 ml. of 57% aqueous hydrobromic acid were added to the mixture within 30 seconds. The mixture was stirred for a further 90 seconds at −35° C., and then 80 ml. of water were added as rapidly as possible and the mixture was vigorously stirred for 3 hours at 0–5° C. The methylene chloride solution was then separated, washed with dilute sodium bicarbonate solution, dried over sodium sulfate and concentrated. The residue was crystallized from benzene-petroleum ether to obtain 1,26-di(2,6,6-trimethyl-1-cyclohexen-1-yl)-3,7,-11,16,20,24 - hexamethyl - 1,3,5,7,9,11,15,17,19,21,23,25- hexacosadodecaen-13-yne of M. P. 189–190° C.

We claim:

1. 1,26 - di(2,6,6-trimethyl-1-cyclohexen-1-yl)-3,7,11,-16,20,24 - hexamethyl - 1,3,5,7,9,11,15,17,19,21,23,25- hexacosadodecaen-13-yne.

2. A process for the manufacture of 1,26-di(2,6,6-trimethyl - 1 - cyclohexen - 1 - yl) - 3,7,11,16,20,24-hexamethyl - 1,3,5,7,9,11,15,17,19,21,23,25-hexacosadodecaen-13-yne, which comprises condensing a 3,8-dimethyl-2,9-di(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene at 5 to 50° C. in an inert solvent in the presence of an acidic condensing agent, hydrolyzing and dealcoholizing the resulting 1,26 - di(2,6,6-trimethyl-1-cyclohexen-1-yl)-3,7,11,-16,20,24 - hexamethyl - 8,10,10,17,17,19 - hexa(lower alkoxy) - 2,4,6,11,15,20,22,24 - hexacosaoctaen - 13 - yne with a member of the group consisting of water soluble acid and water soluble acid salt, reducing the resulting 1,26 - di(2,6,6 - trimethyl - 1 - cyclohexen - 1 - yl)3,7,11,-16,20,24 - hexamethyl - 2,4,6,8,11,15,18,20,22,24 - hexacosadecaen-13-yne-10,17-dione to 1,26-di(2,6,6-trimethyl-1-cyclohexen-1-yl)-3,7,11,16,20,24 - hexamethyl - 2,4,6,8,-11,15,18,20,22,24-hexacosadecaen-13-yne-10,17-diol, and treating the latter with acid whereby formation of two additional double bonds and allyl rearrangement occur to produce 1,26-di(2,6,6-trimethyl-1-cyclohexen-1-yl)-3,7,-11,16,20,24 - hexamethyl - 1,3,5,7,9,11,15,17,19,21,23,25- hexacosadodecaen-13-yne.

3. The process according to claim 2, wherein a 3,8-dimethyl-2,9-di(lower alkoxy)-1,3,7,9-decatetraen-5-yne is condensed at both ends with an 8-(2,6,6-trimethyl-1-cyclohexen-1-yl)-2,6-dimethyl-1,1-di(lower alkoxy)-2,4,6-octatriene at a temperature between 0° and 50° C. in benzene and in the presence of a condensing agent selected from the group consisting of zinc chloride and boron trifluoride etherate, the resulting 1,26-di(2,6,6-trimethyl-1-cyclohexen-1-yl) - 3,7,11,16,20,24 - hexamethyl-8,10,10,17,17,19-hexa(lower alkoxy)-2,4,6,11,15,20,22,24- hexacosaoctaen-13-yne is treated with acetic acid in the presence of sodium acetate, the resulting 1,26-di(2,6,6-trimethyl-1-cyclohexen-1-yl)-3,7,11,16,20,24 - hexamethyl-2,4,6,8,11,15,18,20,22,24 - hexacosadecaen-13-yne-10,17- dione is reduced by means of aluminium propoxide and isopropanol in benzene, and the resulting 1,26-di(2,6,6-trimethyl - 1 - cyclohexen - 1 - yl)-3,7,11,16,20,24-hexamethyl-2,4,6,8,11,15,18,20,22,24 - hexacosadecaen-13-yne-10,17-diol is treated with alcoholic hydrochloric acid in an inert solvent to form 1,26-di(2,6,6-trimethyl-1-cyclohexen-1-yl)-3,7,11,16,20,24 - hexamethyl - 1,3,5,7,9,11,-16,17,19,21,23,25-hexacosadodecaen-13-yne.

4. The process according to claim 2, wherein a 3,8-dimethyl-2,9-di(lower alkoxy)-1,3,7,9-decatetraen-5-yne is condensed at both ends with an 8-(2-6,6-trimethyl-1-cyclohexen-1-yl)-2,6-dimethyl-1,1-di(lower alkoxy)-2,4,6-octatriene at a temperature between 0° and 50° C. in benzene and in the presence of a condensing agent selected from the group consisting of zinc chloride and boron trifluoride etherate, the resulting 1,26-di(2,6,6-trimethyl-1-cyclohexen-1-yl)-3,7,11,16,20,24 - hexamethyl - 8,10,10,-17,17,19-hexa(lower alkoxy)-2,4,6,11,15,20,22,24 - hexacosaoctaen-13-yne is treated with acetic acid in the presence of sodium acetate, the resulting 1,26-di(2,6,6-trimethyl-1-cyclohexen-1-yl)-3,7,11,16,20,24 - hexamethyl-2,4,6,8,11,15,18,20,22,24 - hexacosadecaen - 13-yne-10,17- dione is reduced by means of aluminium propoxide and isopropanol in benzene, the resulting 1,26-di(2,6,6-trimethyl-1-cyclohexen-1-yl)-3,7,11,16,20,24 - hexamethyl-2,4,6,8,11,15,18,20,22,24 - hexacosadecaen-13-yne-10,17- diol is acetylated, and the resulting diacetate is treated with hydrobromic acid in an inert solvent to form 1,26-di(2,6,6-trimethyl-1-cyclohexen - 1 - yl)-3,7,11,16,20,24- hexamethyl-1,3,5,7,9,11,15,17,19,21,23,25 - hexacosadodecaen-13-yne.

5. 1,26-di(2,6,6-trimethyl-1-cyclohexene-1-yl) - 3,7,11,-16,20,24 - hexamethyl - 8,10,10,17,17,19 - hexa(lower alkoxy)-2,4,6,11,15,20,22,24-hexacosaoctaen-13-ynes.

6. A process for the manufacture of 1,26-di(2,6,6-trimethyl - 1 - cyclohexen - 1 - yl)-3,7,11,16,20,24-hexamethyl-8,10,10,17,17-19-hexa(lower alkoxy)-2,4,6,11,15,-20,22,24-hexacosaoctaen-13-ynes, which comprises condensing a 3,8-dimethyl-2,9-di(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene at 5 to 50° C. in an inert solvent in the presence of an acidic condensing agent.

7. 1,26-di(2,6,6-trimethyl - 1 - cyclohexen-1-yl)-3,7,11,-16,20,24-hexamethyl-2,4,6,8,11,15,18,20,22,24 - hexacosadecaen-13-yne-10,17-dione.

8. A process for the manufacture of 1,26-di(2,6,6-trimethyl-1-cyclohexen - 1 - yl) - 3,7,11,16,20,24 - hexamethyl-2,4,6,8,11,15,18,20,22,24 - hexacosadecaen - 13- yne-10,17-dione, which comprises condensing a 3,8-dimethyl-2,9-di(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene at 5 to 50° C. in an inert solvent in the presence of an acidic condensing agent and hydrolyzing and dealcoholizing the resulting 1,26-di(2,6,6-trimethyl-1-cyclohexen-1-yl)-3,7,11,16,20,24-hexamethyl - 8,10,10,17,17,19 - hexa(lower alkoxy)-2,4,6,11,15,20,22,24-hexacosaoctaen-13-yne with a member of the group consisting of water soluble acid and water soluble acid salt.

9. 1,26-di(2,6,6-trimethyl-1-cyclohexen-1-yl) - 3,7,11,-16,20,24-hexamethyl-2,4,6,8,11,15,18,20,22,24 - hexacosadecaen-10,17-di-R-13-ynes wherein R represents a member selected from the group consisting of hydroxy and acetoxy.

10. A process for the manufacture of 1,26-di(2,6,6-trimethyl-1-cyclohexen - 1 - yl) - 3,7,11,16,20,24 - hexamethyl-2,4,6,8,11,15,18,20,22,24-hexacosadecaen-13 - yne-10,17-diol, which comprises condensing a 3,8-dimethyl-2,9-di(lower alkoxy)-1,3,7,9-decatetraen-5-yne at both chains ends with an 8-(2,6,6-trimethyl-1-cyclohexen-1-yl)- 2,6-dimethyl-1,1-di(lower alkoxy)-2,4,6-octatriene at 5 to 50° C. in an inert solvent in the presence of an acidic condensing agent, hydrolyzing and dealcoholizing the resulting 1,26 - di(2,6,6-trimethyl-1-cyclohexen-1-yl)-3,7,11,16,-20,24-hexamethyl-8,10,10,17,17,19-hexa(lower alkoxy)- 2,4,6,11,15,20,22,24-hexacosaoctaen-13-yne with a member of the group consisting of water soluble acid and water soluble acid salt, and reducing the resulting 1,26-di(2,6,6-trimethyl-1-cyclohexen-1-yl)-3,7,11,16,20,24 - hexamethyl-2,4,6,8,11,15,18,20,22,24-hexacosadecaen-13-yne - 10,17- dione to 1,26-di(2,6,6-trimethyl-1-cyclohexen-1-yl)-3,7,11- 16,20,24-hexamethyl-2,4,6,8,11,15,18,20,22,24 - hexacosadecaen-13-yne-10,17-diol.

11. A process for the manufacture of 1,26-di(2,6,6-trimethyl-1-cyclohexen-1-yl)-3,7,11,16,20,24 - hexamethyl- 2,4,6,8,11,15,18,20,22,24 - hexacosadecaen - 10,17 - diacyloxy-13-ynes, which comprises condensing a 3,8-dimethyl-2,9-di(lower alkoxy)-1,3,7,9-decatetraen-5-yne at both chain ends with an 8-(2,6,6-trimethyl-1-cyclohexen-1-yl)-2,6-dimethyl-1,1-di(lower alkoxy)-2,4,6-octatriene at 5 to 50° C. in an inert solvent in the presence of an acidic condensing agent, hydrolyzing and dealcoholizing the resulting 1,26-di(2,6,6-trimethyl-1-cyclohexen-1-yl)-3,7,11,16,20,24-hexamethyl-8,10,10,17,17,19 - hexa(lower alkoxy)-2,4,6,11,15,20,22,24 - hexacosaoctaen-13-yne with a member of the group consisting of water soluble acid and water soluble acid salt, reducing the resulting 1,26-di-(2,6,6-trimethyl-1-cyclohexen-1-yl)-3,7,11,16,20,24 - hexamethyl-2,4,6,8,11,15,18,20,22,24 - hexacosadecaen-13-yne-10,17-dione to 1,26-di(2,6,6-trimethyl-1-cyclohexen-1-yl)-3,7,11,16,20,24 - hexamethyl - 2,4,6,8,11,15,18,20,22,24-hexacosadecaen-13-yne-10,17-diol, and esterifying the 10,-17-hydroxy groups.

References Cited in the file of this patent
UNITED STATES PATENTS

| | | |
|---|---|---|
| 2,609,396 | Inhoffen et al. | Sept. 2, 1952 |
| 2,671,112 | Inhoffen et al. | Mar. 2, 1954 |
| 2,730,549 | Isler et al. | Jan. 10, 1956 |

UNITED STATES PATENT OFFICE
Certificate of Correction

Patent No. 2,867,652                                                            January 6, 1959

Otto Isler et al.

It is hereby certified that error appears in the printed specification of the above numbered patent requiring correction and that the said Letters Patent should read as corrected below.

Columns 1 and 2, last formula, third carbon from left ring, first occurrence, for

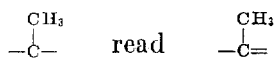

same last formula, right-hand ring for

column 3, line 42, for "alkoxy-" read —alkoxy)- —; column 5, line 66, for "hexacosoactaen" read —hexacosaoctaen—; column 7, line 72, for "16,17," read —15,17,—; line 75, for "-(2-6,6-" read —-(2,6,6- —; column 8, line 21, for "-cyclohexene-" read —-cyclohexen- —.

Signed and sealed this 21st day of April 1959.

[SEAL]

Attest:
KARL H. AXLINE,
*Attesting Officer.*

ROBERT C. WATSON,
*Commissioner of Patents.*